United States Patent
Aquino et al.

(10) Patent No.: US 10,365,180 B2
(45) Date of Patent: Jul. 30, 2019

(54) NON-DESTRUCTIVE LEAK SOURCE DETECTION AND IDENTIFICATION FOR COMPLEX BAGGING IN CONJUNCTION WITH FLOW MEASUREMENT SYSTEMS

(71) Applicant: The Boeing Company, Chicago, IL (US)

(72) Inventors: Timothy D. Aquino, Lehi, UT (US); Kurtis S. Willden, Kent, WA (US); David A. Limon, Roy, UT (US)

(73) Assignee: THE BOEING COMPANY, Chicago, IL (US)

( * ) Notice: Subject to any disclaimer, the term of this patent is extended or adjusted under 35 U.S.C. 154(b) by 305 days.

(21) Appl. No.: 15/380,920

(22) Filed: Dec. 15, 2016

(65) Prior Publication Data

US 2018/0172548 A1   Jun. 21, 2018

(51) Int. Cl.
G01M 3/32 (2006.01)
B29C 70/00 (2006.01)
G01M 3/02 (2006.01)

(52) U.S. Cl.
CPC .......... *G01M 3/3218* (2013.01); *B29C 70/00* (2013.01); *G01M 3/027* (2013.01); *G01M 3/3209* (2013.01)

(58) Field of Classification Search
CPC ..................... G01M 3/3218; G01M 3/3254
See application file for complete search history.

(56) References Cited

U.S. PATENT DOCUMENTS

| | | | | |
|---|---|---|---|---|
| 3,402,596 A | * | 9/1968 | Woodruff | G01M 3/22 48/193 |
| 3,977,233 A | * | 8/1976 | Issel | F17D 5/02 73/40.5 R |
| 4,548,859 A | * | 10/1985 | Kline | B29C 37/006 427/243 |
| 4,735,095 A | * | 4/1988 | Issel | F17D 5/02 73/863.33 |
| 5,466,002 A | * | 11/1995 | Tanaka | B60R 21/01 280/733 |
| 7,328,113 B2 | | 2/2008 | Rothman et al. | |
| 7,413,694 B2 | * | 8/2008 | Waldrop, III | B29C 70/443 264/102 |
| 7,849,729 B2 | * | 12/2010 | Miller | G01M 3/227 264/40.1 |
| 8,298,473 B2 | | 10/2012 | Dull et al. | |
| 8,438,909 B2 | * | 5/2013 | Miller | G01M 3/38 264/40.1 |
| 8,636,252 B2 | * | 1/2014 | Pook | B29C 65/5057 244/119 |
| 8,707,766 B2 | * | 4/2014 | Harris | G01N 21/78 264/571 |
| 9,500,593 B2 | * | 11/2016 | Harris | G01N 21/78 |
| 9,810,596 B2 | * | 11/2017 | Thomas | G01M 3/04 |
| 9,931,807 B2 | * | 4/2018 | Stewart | B32B 1/04 |

(Continued)

*Primary Examiner* — Son T Le
*Assistant Examiner* — Alexander A Mercado
(74) *Attorney, Agent, or Firm* — Haynes and Boone, LLP (57) ABSTRACT

Testing of vacuum bags used in manufacturing of complex co-cure composite structures provides leak detection that allows an operator to identify leaks within a custom vacuum bag without further damaging the bag, such as by cutting vacuum ports into the bag. Such leak detection can allow the operator to find and repair the leak or, if not repairable or at a location of the bag for which repair is not feasible, take other corrective action.

20 Claims, 5 Drawing Sheets

(56) References Cited

U.S. PATENT DOCUMENTS

| | | | | |
|---|---|---|---|---|
| 2003/0082321 | A1* | 5/2003 | Kennedy | G01N 31/225 |
| | | | | 428/35.7 |
| 2005/0253309 | A1* | 11/2005 | Hou | B29C 35/02 |
| | | | | 264/571 |
| 2008/0053198 | A1* | 3/2008 | Issel | F16L 11/12 |
| | | | | 73/40.5 R |
| 2008/0148817 | A1* | 6/2008 | Miller | G01M 3/227 |
| | | | | 73/40 |
| 2009/0273107 | A1* | 11/2009 | Advani | B29C 70/44 |
| | | | | 264/40.1 |
| 2010/0170326 | A1* | 7/2010 | Miller | G01M 3/227 |
| | | | | 73/49.3 |
| 2010/0326172 | A1* | 12/2010 | Voute | G01M 3/3218 |
| | | | | 73/40.7 |
| 2010/0326584 | A1* | 12/2010 | Schibsbye | B29C 70/443 |
| | | | | 156/64 |
| 2012/0048001 | A1* | 3/2012 | Pawlyk | G01M 3/205 |
| | | | | 73/40.7 |
| 2014/0183772 | A1* | 7/2014 | Schibsbye | B29C 70/443 |
| | | | | 264/40.3 |
| 2018/0087997 | A1* | 3/2018 | Thenard | G01M 3/027 |

* cited by examiner

FIG. 5

NON-DESTRUCTIVE LEAK SOURCE DETECTION AND IDENTIFICATION FOR COMPLEX BAGGING IN CONJUNCTION WITH FLOW MEASUREMENT SYSTEMS

TECHNICAL FIELD

The present disclosure relates generally to manufacturing of composite aerospace structures, and, more particularly, to testing vacuum bags prior to committing the bags to use in the processes of composite fabrication in which bag failure carries a high cost penalty.

BACKGROUND

Vacuum bagging is a technique used in the manufacturing of structures using composite materials such as carbon fiber reinforced plastics. Major structural components, such as the wing, fuselage, and tail of modern aircraft, such as the Boeing 787 Dreamliner, can be built almost entirely of composite materials. For example, the horizontal stabilizer surfaces of the 787 are built around a composite spar box that is nearly 40 feet long. Typically, a component will include layers of a reinforcing material such as carbon fiber that are laminated together with a liquefied resin that is cured to a solid state to achieve the required structural properties, e.g., strength and hardness, of the component. By providing a vacuum around the component during cure, the vacuum bag can, for example, apply a uniform pressure for holding the lamina together and prevent or remove bubbles in the resin that can weaken the component when finally cured. Vacuum bagging techniques are well developed and include the use of a number of elements, e.g., mold release films, parting layers, bleeder layers, and breathers. Breathers, for example, can be used to distribute and maintain vacuum evenly throughout the bag during the cure process.

The large structures for which vacuum bagging techniques are now used create a new set of challenges for use of the techniques. Complex, co-cure (e.g., in which structural resins and adhesives are cured simultaneously) composite structures often employ highly contoured, heat-seamed vacuum bags, such as for multi-spar box applications and the spar box example given above. To ensure properly manufactured components, proper functioning requires the vacuum bags used in composite fabrication to maintain vacuum throughout handling and cure operations. The bags are typically heat seamed in the longest dimension to allow the operators to place the bags into the final position relative to the component. Due to their dimensions, locating leaks in these bags can be difficult, and most leak detection operations require destructive evaluation (e.g., cutting vacuum ports into the bag) therefore negating the bag's use in the production of composite structures.

Accordingly, there exists a need in the art for methods and systems that allow an operator to identify leaks within a custom vacuum bag without damaging the bag further, allowing the operator to repair the leak or identify the area of the leak for further corrective action.

SUMMARY

One or more embodiments allow an operator to identify leaks within a custom vacuum bag, without further damaging the bag, such that the operator can find and repair the leak or, if not repairable or at a location of the bag for which repair is not feasible, take other corrective action. For example, it may be decided not to use the particular bag in production in favor of a bag that passes testing; the area or areas of leaks in the bag may be identified to quality, manufacturing engineering, or research and technology departments; and discussions may be held with the supplier for correcting the problem.

In one or more embodiments, a leak identification system includes: a flexible breather; a spine in connection with the flexible breather so as to provide rigidity to the flexible breather, the spine having a first end; and a multiple number of vacuum straws of varying lengths disposed along the spine from the first end and terminating at spaced locations along the spine. The breather, spine, and straws are configured to be readily inserted as a unit into a vacuum bag.

In another embodiment, a sensor array includes: a multiplicity of vacuum sampling tubes of varying lengths extending along side each other to form a cable such that the tubes have termination locations distributed along the length of the cable and a first end of each tube is disposed near a first end of the cable for connection to a vacuum monitoring system; a sleeve configured to allow air flow through its surface; and a spine configured to support the cable for insertion of the spine and the cable into the sleeve. The sensor array is configured such that the sleeve surrounds the cable and the spine, and the sleeve allows air flow from outside the sleeve to the termination locations of the sampling tubes inside the sleeve.

In yet another embodiment, a method includes processes and operations of: inserting into a vacuum bag a sensor array having a plurality of tubular vacuum straws, each straw having a termination location along a length of the sensor array; connecting the vacuum straws to a vacuum monitoring system; monitoring a vacuum applied to the vacuum straws; and locating a leak in the vacuum bag based on data from the monitoring and the termination location of each vacuum straw.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Embodiments of the present disclosure and their advantages may be best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

To address the need in the art to allow an operator to identify (e.g., detect and locate) leaks within a custom vacuum bag without damaging the bag further, non-destructive leak source detection and identification for complex vacuum bagging in conjunction with a flow measurement system is provided, allowing the operator to repair leaks or identify the areas of a bag for which further corrective action may be taken. One embodiment of a non-destructive leak source identification system for complex bagging provides a sensor array for localized zonal detection of a vacuum leak occurring along the length of a long, narrow vacuum sealed bag of the type used (e.g., nylon) for vacuum bagging techniques without direct cutting and installing a tap port or vacuum access anywhere along the length of the bag.

The sensor array, in accordance with one embodiment, may be assembled from a number of independent vacuum sampling tubes having an opening at the end of each tube (e.g., end port) for drawing air out of the bag. The tubes may, for example, be gathered together as a single cable having staggered end port locations such that the locations are spaced apart from each other at a distance of about 18 inches. The sensor array may function as a single axis sampling array to provide a measure of the vacuum level (e.g., a flow rate or pressure difference) at the location of each end port (e.g., tube end).

In use, according to one embodiment, the sensor array may be inserted within the open end of a typical forty foot long heat sealed vacuum bag on top of a breather that is supplied with and inside the bag. Insertion continues until the sensor array cable reaches or comes close to the opposite end of the bag, which is either closed or sealed with sealing tape. The sensor array may be coupled to an associated vacuum sensor system that provides as output a display of the sensed flow rates or pressure differentials for each end port. Variations in sensed flow rates along the total array length may be recorded. Over the total 40 foot length of the bag, an increase in flow rate from one end port to another may indicate a zonal area (e.g., areas of the bag between or proximate to those end ports) of possible leakage.

In one embodiment, a system for non-destructive leak source identification for complex bagging uses a high permeability edge breather in conjunction with a number of vacuum sampling tubes to form a device that can be combined with flow measurement equipment to identify leak locations in a vacuum bag. The device or devices may be tailored to the length and width of one or more common nylon bag kits. The device may have flexible vacuum lines terminating at distinct lengths throughout the edge breather, which may be hollow or tubular itself in shape, and the ends of the vacuum lines outside the breather may tie into common fittings for use on the flow measurement equipment.

The operator of the system, according to one embodiment, can then use a choice of flow measurement equipment to monitor areas of high flow (vacuum loss) and investigate the condition of the bag more closely for repair or other corrective action. Once a leak has been detected and located, various corrective actions may be pursued, such as deciding whether to repair the leak or replace the bag, and may be undertaken with cooperation among various entities responsible for different aspects of the manufacturing process.

In contrast to the reliable and positive determination of vacuum bag leaks provided in accordance with one or more embodiments, one previously used technique employed a hand-held audio "sniffer" device in hopes of detecting the leak location audibly. A serious shortcoming of the technique, however, is that the seamed (e.g., heat-seamed or welded) areas of the bag can sometimes mask the leak such that an operator will not hear the leak using the audio sniffer. A different idea, for use in combination with flow measurement equipment, was to place vacuum ports down the length of the bag, thereby making the bag unusable for production. Such a technique would be useful only if it would be acceptable to scrap or waste the bag to provide for root-cause corrective action investigation for repeating problems.

Figure 1:
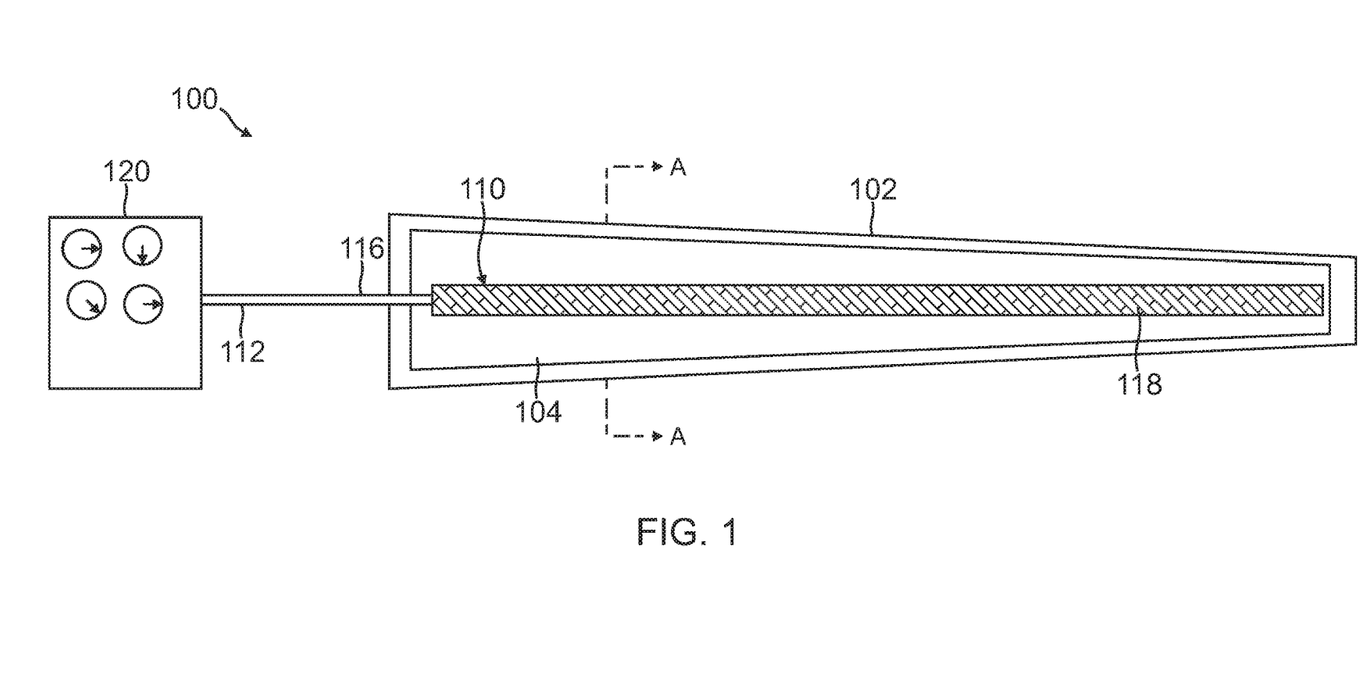
FIG. 1 is a schematic diagram of a system for non-destructive leak source identification for complex bagging, in accordance with an embodiment of the disclosure, applicable to the manufacturing of large structures comprising composite materials.
Figure 2:
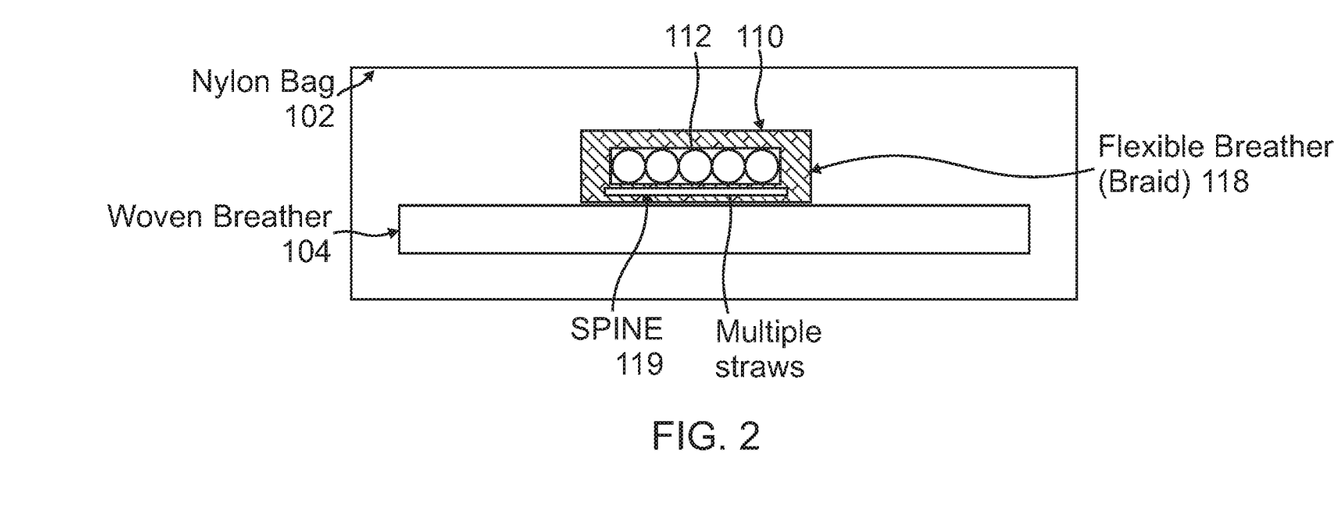
FIG. 2 is a cross sectional view taken along line A-A of FIG. 1 of a schematic diagram of a system for non-destructive leak source identification for complex bagging, in accordance with an embodiment.

FIG. 1 and FIG. 2 illustrate a system 100 for non-destructive leak source detection for complex bagging, in accordance with an embodiment of the disclosure, applicable, for example, in the manufacturing of large structures comprising composite materials. System 100 includes a sensor array 110 configured to detect leaks in a vacuum bag 102 of the kind provided for composites manufacturing. Vacuum bag 102, for example, may be a nylon bag and may be supplied with an "acreage" breather 104. The breather 104 may be provided and pre-installed in the vacuum bag 102 by the supplier of the vacuum bag 102.

Figures 3A, 3B, 3C:
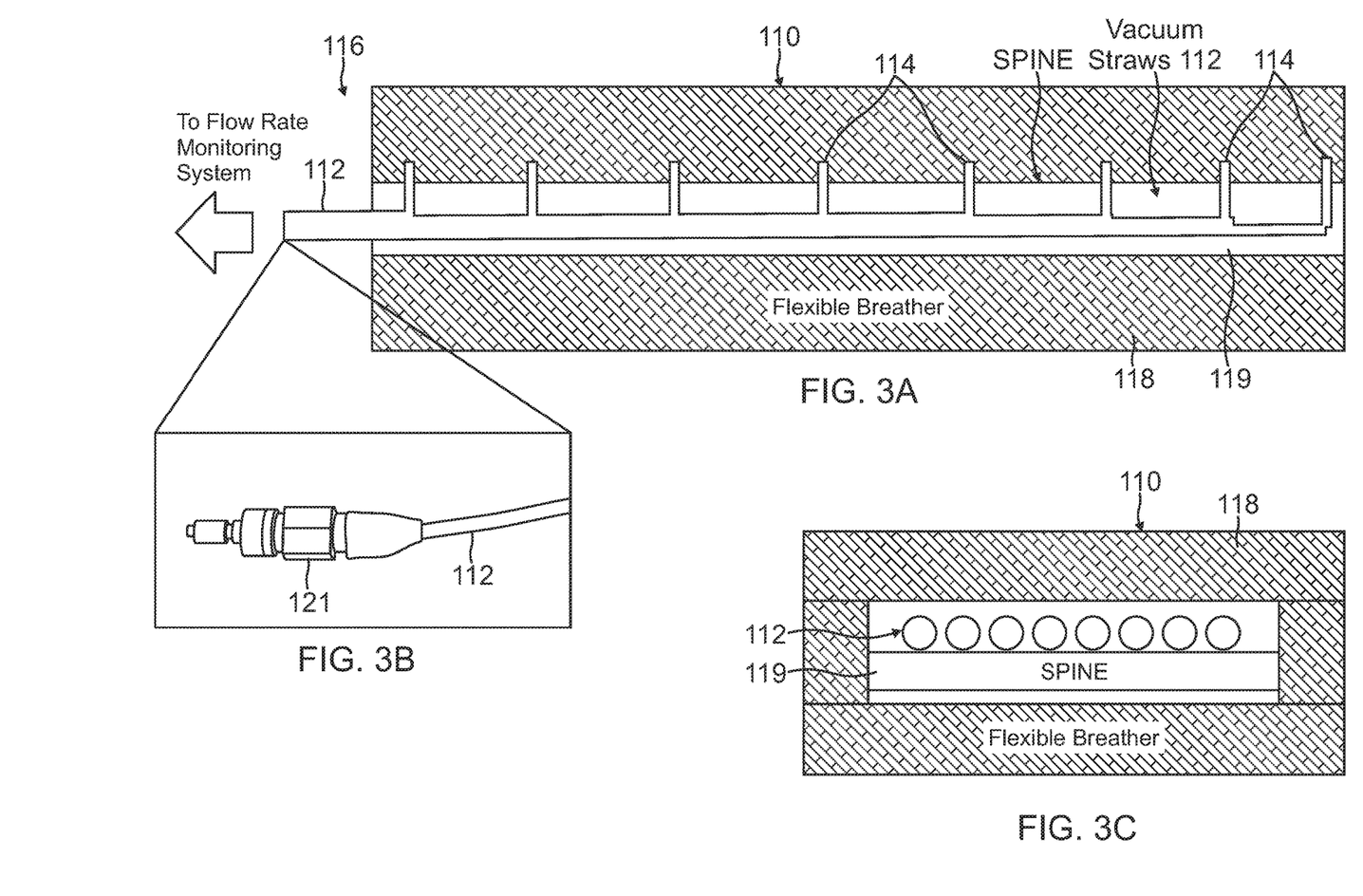
FIG. 3A is a plan view schematic diagram of a sensor array for a system for non-destructive leak source identification for complex bagging, in accordance with an embodiment.
FIG. 3B is an enlarged view of a portion of FIG. 3A, showing a vacuum connector fitting attached to a vacuum straw of the sensor array shown in FIG. 3A, in accordance with an embodiment.
FIG. 3C is an end view for the schematic diagram of the sensor array shown in FIG. 3A, in accordance with an embodiment.

Sensor array 110 is configured to be readily inserted as a unit into vacuum bag 102 so as to extend substantially the entire length of the bag as indicated in FIG. 1. Sensor array 110 may include a number of vacuum straws or tubes 112 of varying lengths disposed along the length of sensor array 110 and configured to terminate at spaced locations (tube ends 114) along the array 110, as seen more clearly in FIG. 3A. As shown in FIG. 3A and FIG. 3C, the multiple vacuum straws 112 may extend along side each other to form a cable such that the tubes have termination locations distributed along the length of the cable and a first end of each tube is disposed near a first end of the cable, at a first end 116 of sensor array 110, for connection to a vacuum monitoring system (e.g., flow rate or pressure monitoring system). At a first end 116 of sensor array 110, the multiple vacuum straws 112 may exit vacuum bag 102 and be connected to vacuum monitoring system 120. Vacuum monitoring system 120 may comprise, for example, a number of volumetric flow meters sufficient to connect each of the vacuum straw tubes 112 to a corresponding flow meter to simultaneously read the flow for each tube end 114 when vacuum is applied to vacuum straw tubes 112. Similarly, vacuum monitoring system 120 may comprise, for example, a number of pressure meters sufficient to connect each of the vacuum straw tubes 112 to a corresponding pressure meter to simultaneously read the pressure for each tube end 114 when vacuum is applied to vacuum straw tubes 112.

To facilitate connection of the sensor array 110 to vacuum monitoring system 120, a connection fitting 121 may be attached to the first end (e.g., ends opposite to the tube ends 114) of each tube 112 as shown in FIG. 3B. The connection fittings 121 can, for example, make connecting sensor array 110 to vacuum monitoring system 120 easy in the sense of being quicker, more positive, and more reliable.

Figure 4:
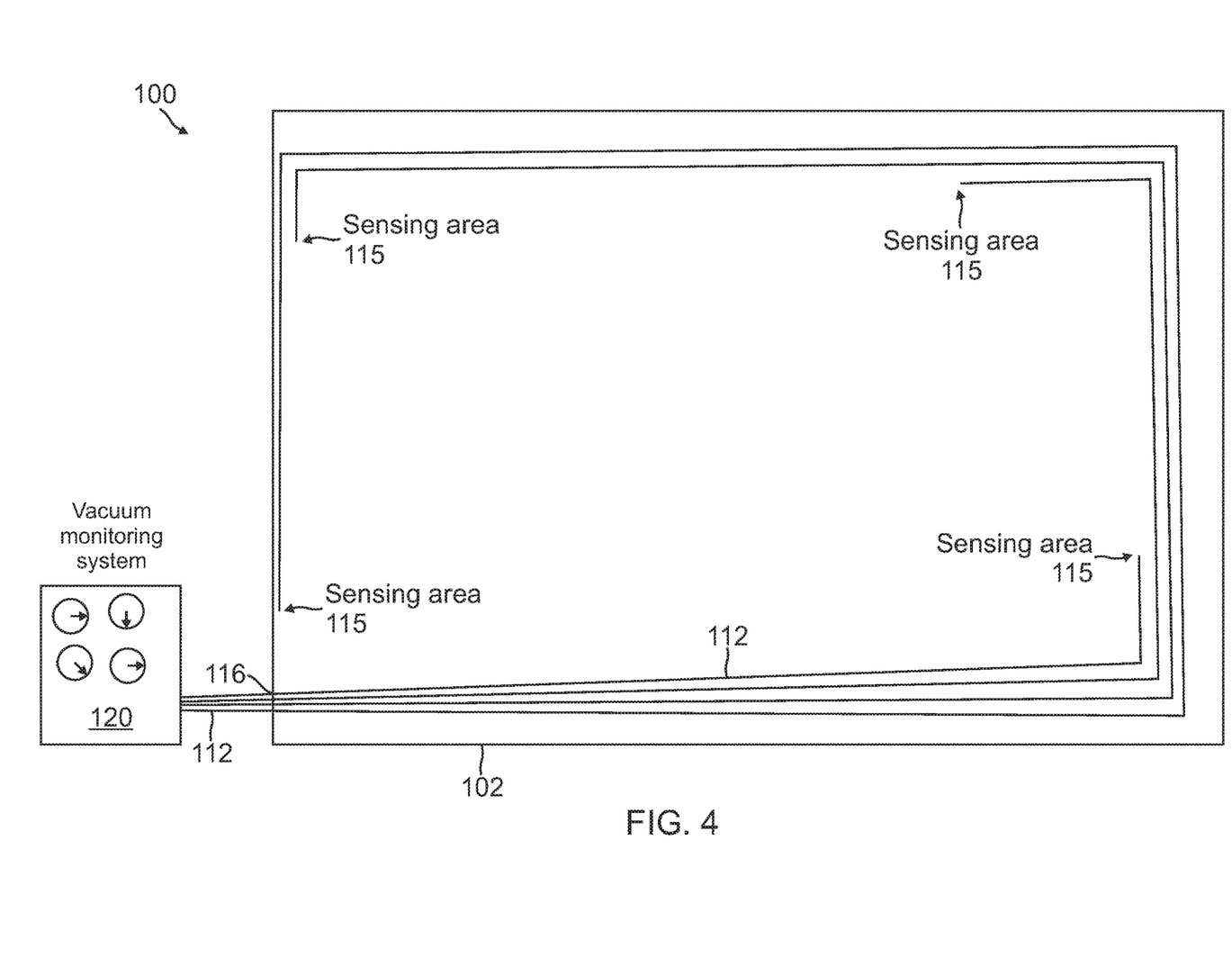
FIG. 4 is a plan view schematic diagram of an alternative embodiment of a sensor array connected to a vacuum monitoring system for non-destructive leak source identification for complex bagging, in accordance with an embodiment.

Vacuum bag 102 can be sealed around the exit 116 of tubes 112 such that a vacuum pressure can be induced in the bag 102 by pumping air out of the bag 102 via vacuum straws 112 while monitoring the individual flow rate or pressure for each tube of vacuum straws 112. The flow rate for each tube then provides information about the vacuum in bag 102 local to the tube end 114 of each tube 112, referred to as a sensing area 115 of tube end 114. For example, for the equally spaced tube ends 114 shown in FIG. 3A, the sensing areas 115 (not shown) of the vacuum bag 102 shown in FIG. 1 will occur as equally spaced sections along the length of the bag 102. Another example of sensing areas 115 is shown in FIG. 4.

In operation of system 100 for leak detection of bag 102, for example, if the flow rate for all of the tubes 112 is low, it may be deduced that the bag 102 has no leaks, whereas if one of the tubes 112 has a higher flow rate a leak in the bag may be traced to a location (sensing area 115) close to the tube end 114 for the tube with the higher flow rate.

In one embodiment, vacuum straw tubes 112 may comprise polyethylene tubing, for example. Vacuum straw tubes 112 may be sealed where they exit bag 102 using, for example, sealant tape. In another example, the exit of tubes 112 from bag 102 may be sealed using a rubber type cork where the cork is clamped to the bag, such as a typical bag source port that is commonly used in attaching vacuum lines to a vacuum bag.

Sensor array 110 may also include a flexible breather 118 that may function to support multiple vacuum straw tubes 112 or keep them gathered together for insertion into bag 102. Breather 118 may also function to keep the tubes 112 in place, e.g., maintaining the relative positions of tube ends 114 relative to each other, during operation of sensor array 110 for testing bag 102 for leaks. Breather 118 may be configured as a sleeve or tube surrounding multiple straws 112 as seen in FIG. 2 and shown more clearly in FIG. 3C.

A spine 119 also may be provided in connection to the flexible breather 118, as shown in FIG. 2 and FIG. 3C, and may extend from its first end at the first end 116 of sensor array 110 along the length of the breather, as shown in FIG. 3A, so as to provide some rigidity to the flexible breather that can aid insertion of sensor array 110 into vacuum bag 102. Spine 119 may comprise a plastic material that is less flexible than the breather 118 material or less flexible than the material of tubes 112 so as to provide some stiffness to sensor array 110 that aids insertion and positioning of sensor array 110 into vacuum bag 102, yet still allows sensor array 110 to have some beneficial amount of flexibility for maneuvering sensor array 110 inside vacuum bag 102. For example, spine 119 may provide beneficial rigidity yet allow sensor array 110 to retain enough flexibility to provide other benefits such as ability to coil sensor array 110 for easier storage before or when not in use.

Breather 118 may comprise one or more typical edge breather materials, for example, non-woven nylon and polyester mats, woven fiberglass, metal chains, and various types of braids and meshes. The breather material does not restrict vacuum flow from bag 102 into the tube ends 114 of tubes 112, even though the tube ends 114 and tubes 112 may be surrounded by the breather 118 as seen in FIG. 1, FIG. 3A, and FIG. 3C. In one embodiment, for example, breather 118 may comprise a braided edge seal breather material cut to a length corresponding to the length of vacuum bag 102 and forming a braided tube down which the spine 119 and the plurality of vacuum tube straws 112 can be inserted. In alternative embodiments, breather 118 may be configured, for example, as a more flat shape, to which a spine 119 and vacuum straw tubes 112 may be affixed, to provide the same functionality for insertion, maneuvering, positioning, and maintaining position in vacuum bag 102. Such an embodiment is shown, for example, in FIG. 4. Also, in alternative embodiments, multiple spines 119 may be provided to facilitate custom bag shapes or special constraints for positioning tube ends 114, such as shown in FIG. 4.

Figure 5:
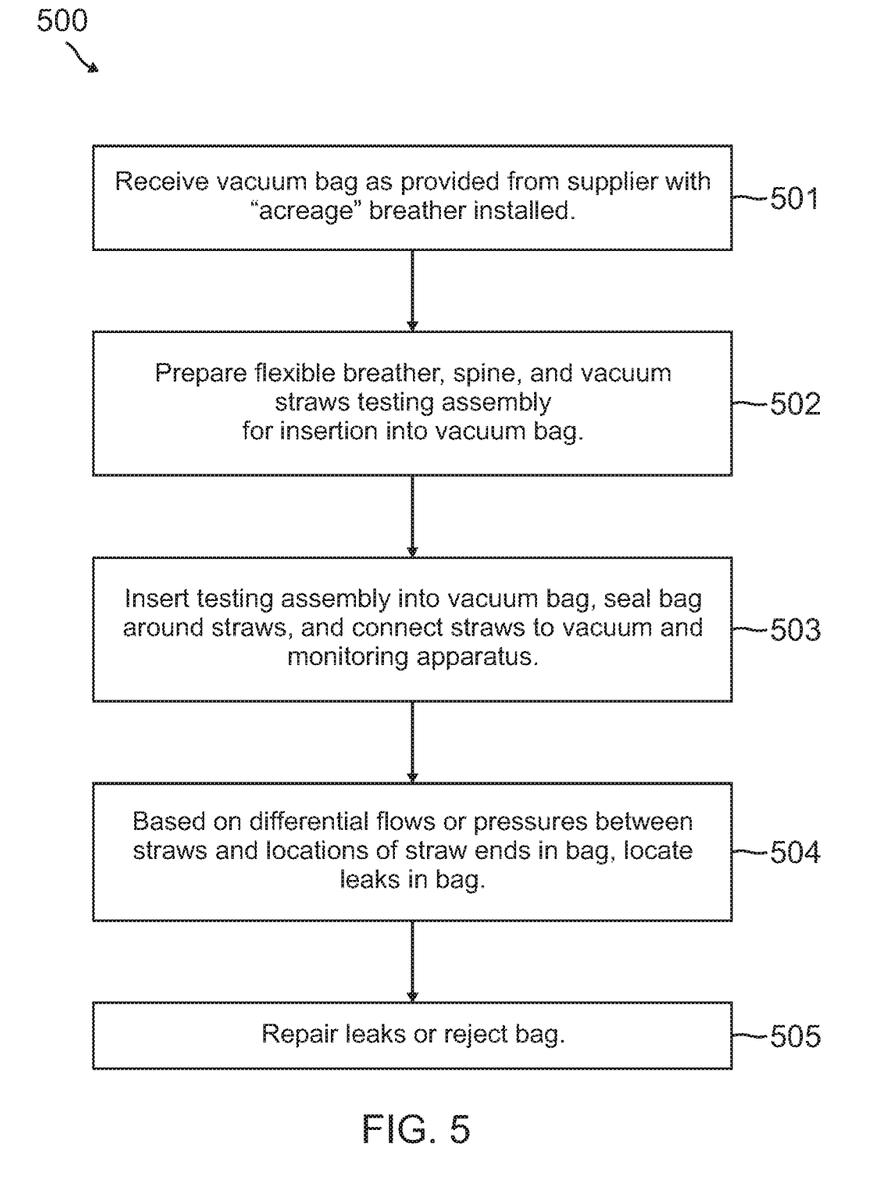
FIG. 5 is a flow diagram illustrating a method of non-destructive leak source identification for complex bagging, in accordance with an embodiment of the disclosure, applicable to the manufacturing of large structures comprising composite materials.

FIG. 5 illustrates a method 500 of non-destructive leak source determination for complex bagging, in accordance with an embodiment of the disclosure, applicable, for example, in the manufacturing of large structures comprising composite materials.

Method 500 may include several acts 501-505, including an act 501 of receiving vacuum bag (e.g., vacuum bag 102) as provided from a supplier with "acreage" breather (e.g., breather 104) installed. At an act 502, a flexible breather 118, a spine 119, and a number of vacuum straw tubes 112 may be prepared as a testing assembly (e.g., sensor array 110) for insertion into the vacuum bag 102. For example, preparing the test assembly may include assembling the sensor array to provide an assembly of a spine 119, the tubular vacuum straws 112, and a flexible breather 118 such that the assembly is stiff enough to insert into the bag yet flexible enough not to damage the bag during insertion. In an embodiment in which flexible breather 118 is configured as a tube or sleeve, such assembly may include inserting the spine 119 and tubes 112 into the sleeve and fishing the spine 119 and tubes 121 down the length of the sleeve 118 until tube ends 114 are correctly positioned with in the sleeve according to a specified spacing along the vacuum bag 102 into which the sensor array 110 is to be inserted.

Method 500 may include an act 503 of testing preparation including inserting the testing assembly (e.g., sensor array 110) into the vacuum bag, sealing the bag around the vacuum sampling straws, and connecting the vacuum sampling straws to vacuum pumping and monitoring apparatus. Sensor array 110 can be inserted to ride on top of the breather 104 as shown in FIG. 1 and FIG. 2, and the bag 102 can be sealed at the exit 116 of the cable of vacuum sampling straws 112 using, for example, sealant tape or rubber type cork seal, as described above. Each straw (e.g., polyethylene tube) of the cable of vacuum sampling straws 112 may be connected using a connector, such as shown in FIG. 3B, to a vacuum monitoring system 120. Each straw or tube 112 can be connected to a distinct meter of vacuum monitoring system 120 for individual monitoring of each vacuum sampling tube. Each meter, thus, may measure a flow rate or a vacuum pressure level of the bag 102 at a distinct tube end 114 or sensing area 115 of bag 102.

At act 504, a vacuum may be applied to the vacuum sampling straws 112 and each tube of the vacuum sampling straws 112 may be individually monitored using the vacuum monitoring system 120. Based on differential flows or pressures between the tubes and the locations (e.g., sensing areas 115) of corresponding tube ends 114 in bag 102, the location of any leaks in bag 102 can be detected and identified. For example, the location of a detected leak can be narrowed down to the sensing area 115 located either near or between tube ends 114 of the tube or tubes 112 showing anomalous flow. In one embodiment act 504 may include comparing measurements from different meters of vacuum monitoring system 120 to determine a leak location based on differences in measurements between the meters and the termination location 114 of sampling tubes 112 corresponding to each meter. For example, based on a greater than normal difference in pressure or flow between locations 2 and 3, it may be inferred that a leak in the bag may exist somewhere between those two locations (e.g., vacuum sampling tube terminations 2 and 3) along the bag. In one embodiment, an additional technique is to externally seal off portions of the bag (e.g., one or more sensing areas 115) corresponding to termination locations 114 affecting the different flow rates, so that the location of a leak can be narrowed down, either to the sealed off section or a sections that is not sealed off. Externally sealing off portions of the bag can be accomplished using sealing tape, for example.

Method 500 may also include an act 505 of taking appropriate action, as described above, in response to detecting a leak in a bag 102 and identifying its location. For example, depending on the location of a leak some leaks can be repaired, some leaks may occur in a location of the bag that is not needed in a final production configuration of the bag, and some leaks can cause the bag to be rejected for use in production.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A leak identification system comprising:
   a flexible breather;
   a spine in connection with the flexible breather so as to provide rigidity to the flexible breather, the spine having a first end; and
   a plurality of vacuum straws of varying lengths disposed along the spine from the first end and terminating at spaced locations along the spine, wherein:
   the breather, spine, and straws are configured to be inserted as a unit into a vacuum bag.

2. The system of claim 1, wherein the flexible breather further comprises an edge seal breather cut to a length corresponding to the vacuum bag.

3. The system of claim 1, wherein the flexible breather further comprises a braided tube down which the spine and the plurality of vacuum straws are inserted.

4. The system of claim 1, wherein the plurality of vacuum straws of varying lengths further comprises:
   a number of straws corresponding to a number of sensing areas of the vacuum bag to be tested, wherein:
   the straws are cut to lengths that provide equally spaced termination locations along the length of the vacuum bag, each termination location corresponding to a sensing area of the vacuum bag.

5. The system of claim 1, further comprising multiple spines.

6. The system of claim 1, wherein the spine comprises a plastic sheet that is more rigid than the plurality of straws.

7. The system of claim 1, further comprising a sealant tape applied to the vacuum bag so as to seal the vacuum bag around an exit of the plurality of straws from the vacuum bag.

8. The system of claim 1, further comprising at least one vacuum connector attached to a vacuum straw at an end opposite the termination of the vacuum straw, the vacuum connector configured to be easily connectable to a vacuum monitoring system.

9. The system of claim 1, further comprising a vacuum monitoring system connected to the plurality of vacuum straws.

10. A sensor array comprising:
    a plurality of vacuum sampling tubes of varying lengths extending along side each other to form a cable such that the tubes have termination locations distributed along the length of the cable and a first end of each tube is disposed near a first end of the cable for connection to a vacuum monitoring system;
    a sleeve configured to allow air flow through its surface; and
    a spine configured to support the cable for insertion of the spine and the cable into the sleeve, wherein:
    the sleeve surrounds the cable and the spine; and
    the sleeve allows air flow from outside the sleeve to the termination locations of the sampling tubes inside the sleeve.

11. The sensor array of claim 10, wherein:
    the spine, and the sleeve have a length corresponding to a vacuum bag into which the sensor array is to be inserted; and
    the cable has a corresponding length that allows the cable to protrude from the bag for connection to the vacuum monitoring system.

12. The sensor array of claim 11, wherein a number of vacuum sampling tubes is provided such that the number allows for the termination locations distributed along the length of the cable to occur at a specified spacing along the vacuum bag into which the sensor array is to be inserted.

13. The sensor array of claim 10, further comprising a plurality of vacuum connectors each attached to one of the plurality of vacuum sampling tubes of varying lengths at the first end of each tube, wherein the vacuum connectors are configured to be connectable to the vacuum monitoring system.

14. The sensor array of claim 10, wherein:
    the sleeve comprises a flexible, braided breather material; and
    the vacuum sampling tubes comprise polyethylene tubing.

15. A method comprising:
    inserting into a vacuum bag a sensor array having a plurality of tubular vacuum straws, each straw having a termination location along a length of the sensor array;
    connecting the vacuum straws to a vacuum monitoring system;
    monitoring a vacuum applied to the vacuum straws; and
    locating a leak in the vacuum bag based on data from the monitoring and the termination location of each vacuum straw.

16. The method of claim 15, wherein connecting the vacuum straws to the vacuum monitoring system further comprises connecting each vacuum straw to a distinct meter of the system, wherein each meter measures a flow rate or a vacuum pressure level.

17. The method of claim 15, wherein monitoring the vacuum applied to the vacuum straws further comprises comparing measurements of each meter to determine a leak location based on differences in measurements between meters and the termination location of each straw corresponding to each meter.

18. The method of claim 17, wherein monitoring the vacuum applied to the vacuum straws further comprises:
externally sealing off a portion of the bag corresponding to a particular termination location of a particular vacuum straw; and
evaluating the measurement of a particular meter corresponding to the particular vacuum straw in comparison to the remaining meters; and
narrowing down the location of the leak based on the evaluation.

19. The method of claim 15, wherein inserting the sensor array into the vacuum bag further comprises sealing the vacuum bag around the vacuum straws such that the vacuum straws exit the bag for connection to the vacuum monitoring system.

20. The method of claim 15, wherein inserting the sensor array into the vacuum bag further comprises assembling the sensor to provide an assembly of a spine, the tubular vacuum straws, and a flexible breather such that the assembly is stiff enough to insert into the bag yet flexible enough not to damage the bag during insertion.

* * * * *